United States Patent [19]

Klittich

[11] Patent Number: 4,466,547
[45] Date of Patent: Aug. 21, 1984

[54] DISPOSABLE FLEXIBLE CONTAINERS FOR BABY FEEDING BOTTLES

[76] Inventor: Klaus Klittich, P.O. Box 501, Germiston, Transvaal, South Africa

[21] Appl. No.: 381,230

[22] Filed: May 24, 1982

[30] Foreign Application Priority Data

Jun. 5, 1981 [ZA] South Africa ............... 81/3770

[51] Int. Cl.$^3$ ............................................. A61J 9/00
[52] U.S. Cl. ..................................... 215/11 E; 383/37
[58] Field of Search .............. 215/11 E, 11 R; 229/53, 229/57

[56] References Cited

U.S. PATENT DOCUMENTS

| | | | |
|---|---|---|---|
| 2,604,222 | 7/1952 | Teague et al. | 215/11 E |
| 2,624,485 | 1/1953 | Boston | 215/11 E |
| 2,859,891 | 11/1958 | Carkin | 215/11 E |
| 2,881,935 | 4/1959 | Garred | 215/11 |
| 2,885,104 | 5/1959 | Greenspan | 215/6 |
| 3,061,129 | 10/1962 | Fitzgerald | 215/11 E |
| 3,075,666 | 1/1963 | Hoffstein | 215/11 E |
| 3,134,494 | 5/1964 | Guinn | 215/11 E |
| 3,204,855 | 9/1965 | Boynton et al. | 229/53 |
| 3,471,050 | 10/1969 | Barr | 215/11 E |
| 3,645,414 | 2/1972 | Barr | 215/11 R |
| 3,790,017 | 2/1974 | Fitzpatrick et al. | 215/11 E |
| 3,998,348 | 12/1976 | Sammaritano | 215/11 E |
| 4,339,046 | 7/1982 | Coen | 215/11 E X |

FOREIGN PATENT DOCUMENTS

| | | |
|---|---|---|
| 2803961 | 8/1978 | Fed. Rep. of Germany. |
| 1215335 | 4/1960 | France. |
| 1287487 | 2/1962 | France. |
| 2232300 | 1/1975 | France ............... 215/11 E |
| 2434759 | 3/1980 | France. |
| 71844 | 2/1975 | Luxembourg. |
| 602103 | 7/1978 | Switzerland. |

Primary Examiner—William Price
Assistant Examiner—Sue A. Weaver
Attorney, Agent, or Firm—Finnegan, Henderson, Farabow, Garrett & Dunner

[57] ABSTRACT

In or for a baby feeding bottle an open-ended, disposable, flexible and collapsible, bag-like container mountable in a reusable tubular housing including container anchoring means comprising clamp formations of tongue and groove form located at low level in the housing. The container includes a base formation comprising an engagement formation spaced from the base of the container and attachment means securing the engagement formation to the container base. The engagement formation is engageable by the clamp formations to anchor the base of the container and fix the extent of the mouth zone of the container available for folding over an open upper end of the housing, and the attachment means is adapted at least to minimize distortion of the container when the engagement formation is engaged by the tongue and groove anchoring means. Reliable sealing of the contents of the container can be obtained.

9 Claims, 7 Drawing Figures

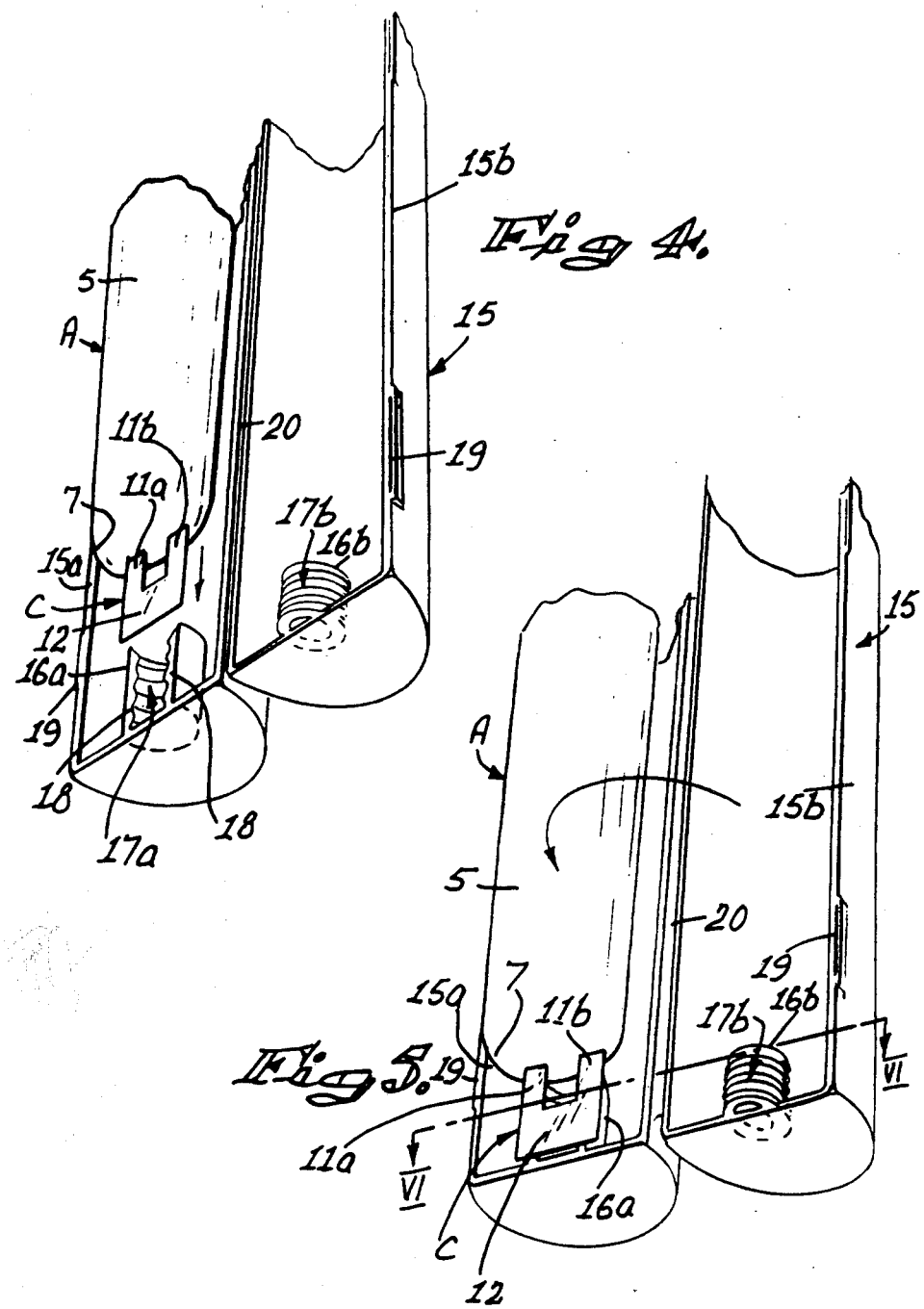

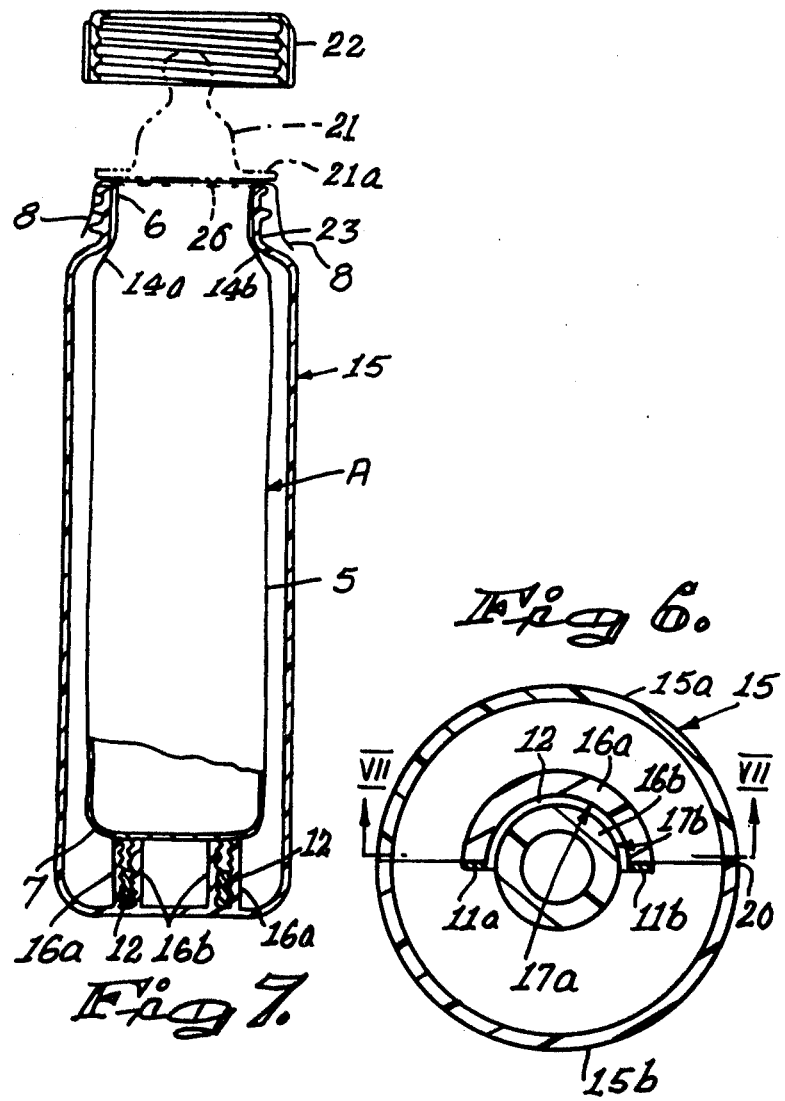

DISPOSABLE FLEXIBLE CONTAINERS FOR BABY FEEDING BOTTLES

This invention relates to disposable flexible containers for baby feeding bottles.

It is known to provide a feeding bottle of the kind comprising a reusable tubular housing for a disposable, flexible bag-like container for liquids, the container being suspendable in the interior of the housing with the mouth zone of the container folded over the open upper end of the housing. The container is sealingly securable in position at the upper end of the housing by means of a suitable teat or nipple, with or without the aid of a suitable sealing or locking ring.

Feeding bottles of the kind in question and disposable containers therefor are disclosed, for example, in U.S. Pat. Nos. 2,624,485, 3,075,666, 3,204,855, 3,645,414 and 3,790,017.

A contents scale is normally provided on the tubular housing but with conventional arrangements a reliable indication of the contents of the container can scarcely be obtained since a container suspended in the tubular housing depends a distance below the upper end of the housing which varies according to the extent to which the container mouth is folded over the upper end of the housing.

In order to avoid the disadvantage, I disclose in the complete specification of my related South African Pat. No. 82/2208, which correspond to my U.S. application Ser. No. 359,088, filed Mar. 17, 1982, that anchoring means may be located at low level in the tubular housing and adapted to anchor the base of a flexible container to fix the extent of the mouth zone of the container available for folding over the upper end of the tubular housing.

With the arrangement of the previous paragraph, the fold of disposable flexible containers over the upper end of a tubular housing may be relatively uniform from container to container so that the length of the container depending below the upper end of the tubular housing may be relatively uniform from container to container, whereby a relatively reliable indication of the contents of a container suspended in the tubular housing may be obtained. More particularly, I disclose in my SA patent specification No. 82/2208 that the tubular housing may be longitudinally divided into two sections which are movable between open and closed positions and that the anchoring means may comprise clamping means adapted to be inoperative when the two housing sections are in an open position and to engage a base region of the container when the two housing sections are in their closed position. Preferably, the base region of the container which is engaged by the clamping means comprises a tongue or other suitable base formation depending from the container body so that the actual body of the container is not engaged by the clamping means.

I also disclose that the clamping means may comprise co-operating clamp formations of tongue and groove form on the two housing sections which present mating surfaces of complementary semi-circular or other suitable cross-sectional configuration which are adapted to nip the base region of the container between them when the two housing sections are in their closed position.

With clamping means of tongue and groove form presenting curved or other mating surfaces which do not lie in a single plane, there is a tendency for a flexible container to be distorted in shape when a base formation depending from the container is engaged by the mating surfaces, if the base formation is not complementary in shape to the mating surfaces. It will be appreciated that distortion of a container affects the reliability of the indication of its contents by a scale on the tubular housing. However, it is difficult and expensive to provide base formations which are complementary to tongue and groove mating surfaces, on disposable flexible containers which are mass produced.

It is accordingly an object of the present invention to avoid or at least to minimize the above disadvantage.

According to the invention a flexible container adapted to be located in a tubular housing to constitute a baby feeding bottle, includes an engagement formation which is spaced from the base of the container; and attachment means securing the engagement formation to a base zone of the container, the engagement formation being adapted to be engaged by anchoring means located at low level in the tubular housing to anchor the base of the container and the attachment means being adapted to avoid or at least to minimize distortion of the container when the engagement formation is engaged by the anchoring means of the tubular housing.

The attachment means may be located relative to the base of the container and/or may be secured to the container and/or may be shaped and/or dimensioned in such manner that it avoids or at least minimizes distortion of the container when the engagement formation is engaged by the anchoring means of the tubular housing.

The attachment means may be suitably located relative to the base of the container such that at least in the zone in which it is secured to the container, the attachment means is not engageable by the anchoring means of the tubular housing.

The attachment means may comprise a pair of transversely spaced elements extending longitudinally from the container, the engagement formation being located transversely between the attachment elements in a position spaced from the base of the container.

The attachment means and the engagement means may be integrally formed with each other and with the container.

There may be provided a strip of flexible containers in which a series of containers according to the invention are connected in separable end-to-end relationship.

According to another aspect of the invention a baby feeding bottle comprises:

a reusable housing of tubular configuration which has an open end and includes anchoring means located at low level in the housing; an open-ended, disposable flexible container according to the invention which is adapted to be mounted in the housing with the engagement formation of the container engaged by the anchoring means in the housing to anchor the base of the container and with the mouth zone of the container folded over the open upper end of the housing; and a teat adapted to be sealingly located on the upper end of the housing over the mouth of the container.

According to a further aspect of the invention a method of producing a flexible container according to the invention, includes the steps of providing a blank comprising a tube of flexible material which is flattened to present two superimposed layers of material continuously joined along opposite sides thereof; suitably shaping the blank to provide a tubular body portion with a mouth zone at one end thereof and a base zone at the opposite end thereof, at least one set of superimposed attachment formations extending longitudinally from the base end of the body portion and a set of superimposed engagement formations on the attachment formations in a position spaced from the base end of the body portion; and joining the two layers of material of the body portion together along the entire base zone thereof to close the base end of the body portion.

The blank may be shaped also to provide separable tab formations extending longitudinally from the mouth zone of the body portion. The mouth zone of the body portion may be adapted to be folded over the upper end of a tubular housing in which the body portion is to be located by manipulation of the tab formations.

The blank may be shaped on opposite sides thereof at or near the mouth zone of the tubular body portion to provide tab formations which are less in width than the body portion, and shoulder zones between the body portion and the tab formations; and the two layers of material may be joined together in the shoulder zones to provide an open mouth zone which is less in width than the body portion. The tube of flexible material constituting the blank may comprise thermoplastic material and the superimposed layers of material may be joined together in the required zone or zones by heat sealing.

The blank may be shaped and the superimposed layers joined together where required, in successive operations.

Alternatively, the blank may be shaped and the superimposed layers may be joined together where required, substantially simultaneously.

For the mass production of containers, it is preferable to provide an elongate blank and to produce a plurality of containers therefrom. Thus, a plurality of containers may be produced successively in separate operations from a common elongate blank. Preferably, a plurality of containers are produced substantially simultaneously from a common elongate blank.

Preferably also, a series of containers are produced in end-to-end relationship from a common elongate blank to provide a strip of containers in which each pair of adjacent containers are joined together along a transverse separation zone.

The separation zone may be weakened to facilitate separation.

For a clear understanding of the invention preferred embodiments will now be described, purely by way of example, with reference to the accompanying drawings in which:

FIG. 4 is a diagrammatic and fragmentary perspective view of the lower region of a tubular housing as disclosed in my South African complete patent specification No. 82/2208 in an open position, illustrating a step in the location of a filled container as shown in FIG. 2 in the tubular housing.

FIG. 5 is a diagrammatic and fragmentary perspective view similar to that of FIG. 4, showing the engagement formation on the container in position to be nipped by the clamp formations of the tubular housing upon closure of the latter.

FIG. 6 is a diagrammatic cross-sectional view to an enlarged scale of the tubular housing on the line VI—VI in FIG. 5, showing the tubular housing in a closed position and the engagement formation of the bag nipped between the clamp formations of the tubular housing to anchor the base of the container.

FIG. 7 is a diagrammatic longitudinal sectional view to a reduced scale on the line VII—VII in FIG. 6, showing the tubular housing in the closed position with the bag operatively mounted in the housing.

Figure 1:
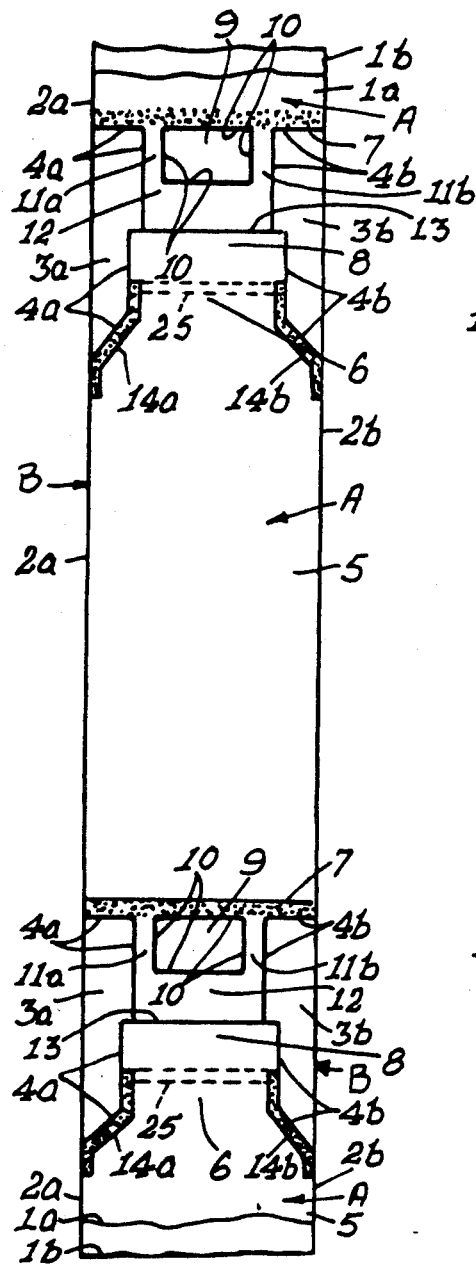
FIG. 1 is a fragmentary plan view of an elongate blank for the production of a strip of disposable, flexible and collapsible containers suitable for use with a reusable tubular housing as disclosed in my South African complete patent specification No. 82/2208, illustrating the formation of the containers.
Figure 2:
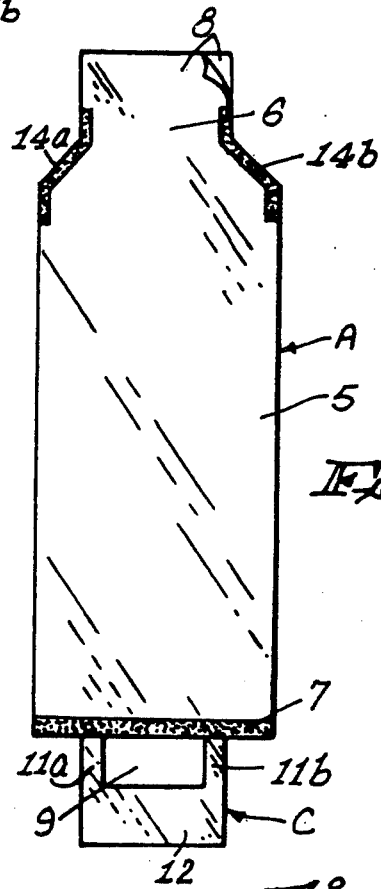
FIG. 2 is a plan view of one of the completed containers of FIG. 1, illustrating one form of engagement formation on the container.

Referring first to FIGS. 1 and 2 of the drawings, a series of disposable and collapsible, flexible containers A are made from a common, elongate blank B which comprises a tube of suitable flexible and liquid impervious synthetic resinous material which is flattened to present two superimposed layers 1a, 1b of material which are continuously joined along opposite longitudinal sides 2a, 2b thereof.

Blank B is suitably shaped by stamping out portions 3a, 3b on opposite sides of the blank and at regularly spaced intervals along the length of the blank along lines 4a, 4b respectively to provide for each container A to be formed an intermediate tubular body portion 5 with a mouth zone 6 at one end of body portion 5 and a base zone 7 at the opposite end of body portion 5; two separable tab formations 8 which extend longitudinally from the mouth zone of body portion 5 and are less in width than body portion 5; and converging shoulder zones 14a, 14b between body portion 5 and tab formations 8. The two tab formations 8 are integral with the two layers of material 1a, 1b respectively of body portion 5.

Simultaneously with the stamping out of portions 3a, 3b on opposite sides of blank B, portions 9 are stamped out along lines 10 at regularly spaced intervals along the length of blank B to provide for each container A to be formed two transversely spaced sets of superimposed attachment formations 11a, 11b which extend longitudinally from the base end of body portion 5 and one set of superimposed engagement formations 12 on the outer ends of the attachment formations 11a, 11b in a position spaced from the base end of body portion 5. Each set of attachment formations 11a, 11b comprises two superimposed layers of material integral with the two layers of material 1a, 1b of body portion 5. The set of engagement formations 12 comprises two superimposed layers of material integral with the two superimposed layers of material 1a, 1b respectively constituting the attachment formations 11a, 11b.

The outer ends of the engagement formations 12 for each container A to be formed are joined in transverse zone 13 to the outer ends of the tab formations 8 for the adjacent container A in the series of containers to be formed from blank B. Simultaneously with the shaping of blank B, the superimposed layers of the blank are weakened, such as by means of a series of perforations, along the transverse zones 13 in which adjacent containers A are joined together.

Simultaneously with the shaping of the blank B as described above or in a subsequent operation, the two superimposed layers of material 1a, 1b of the body portions 5 are sealingly joined together transversely to the body portions 5 along the entire base zone 7 of each body portion 5 in order to close the base end of each body portion 5 in fluid tight manner.

Simultaneously with the closure of the base ends of the body portions 5, the two superimposed layers of material 1a, 1b are also sealingly joined together in shoulder zones 14a, 14b on opposite sides of each body portion 5 in the region of its mouth zone 6 in order to provide for each container 5 an open mouth zone which is less in width than body portion 5 and separable tab formations 8 to permit the mouth zone of the tubular body portion 5 of each completed container A to be folded over the upper end of a tubular housing in which the container A is located, by manipulation of the tab formations 8.

The synthetic resinous material of blank B preferably comprises thermoplastic material, such as polyethylene, so that the superimposed layers of material 1a, 1b may be sealingly joined together in base zones 7 and shoulder zones 14a, 14b by heat sealing.

With the arrangement described above, a plurality of bag-like containers are produced in end-to-end relationship from a common elongate blank B to provide a strip of flexible containers A in the form of flat socks which are joined sequentially one to the other along the transversely extending, longitudinally spaced, weakened zones 13.

A container A located at an end of the strip may be separated for use by tearing it off from the strip along the weakened zone 13 at the outer end of its engagement formation 12 or at the outer end of its tab formations 8, thereby to provide an individual disposable, open-ended and flexible bag-like container A in the form of a sock as shown in FIG. 2 which is flattened when not in use and is expandable to tubular shape when filled.

A container A may be mounted in a tubular housing as disclosed in my SA complete patent specification No. 82/2208, before or after the container has been filled with liquid.

Referring now to FIGS. 4 to 7, a container A may be loaded in a tubular housing 15 of the type disclosed in my South African patent specification No. 82/2208, which is longitudinally divided into two halves 15a, 15b which are linked along a longitudinally extending hinge zone 20 and are movable about hinge zone 20 between open and closed positions. Tubular housing 15 includes co-operating clamp formations 16a, 16b of tongue and groove form presenting mating, screw-threaded clamping surfaces 17a, 17b of complementary semi-circular cross-sectional configuration between which the engagement formation 12 of container A may be nipped. The clamping surface 17a of clamp formation 16a has a concave cross-sectional configuration and the clamping surface 17b of clamp formation 16b has a complementary convex cross-sectional configuration.

As shown in FIGS. 4 and 5, container A may be placed in the one half 15a of tubular housing 15 when the housing is in an open position. As shown in FIG. 5 the base 7 of container A may be located on the upper end of clamp formation 16a of housing half 15a so that engagement formation 12 on container A depends from the body 5 of the container and is located adjacent to clamp formation 16a. The tab formations 8 of container A may extend through the open upper end 26 of housing half 15a.

The dimensions of attachment formations 11a, 11b and engagement formation 12 and the transverse spacing between attachment formations 11a, 11b are related to the dimensions of clamp formations 16a, 16b in tubular housing 15 so that engagement formation 12 extends across the mouth of the concave clamping surface 17a of clamp element 16a in a position spaced downwardly from the base zone 7 of bag A and so that attachment formations 11a, 11b are located adjacent the diametrically disposed faces 18 of clamp formation 16a on opposite sides of the mouth of concave clamping surface 17a, without extending into the mouth zone of concave clamping surface 17a. The transverse spacing between attachment formations 11a, 11b should be at least equal to, and preferably somewhat greater than, the width of the mouth of concave clamping surface 17a between the diametrically disposed faces 18 of clamp formation 16a so that at least in the zone in which they are secured to bag body 5, the attachment formations 11a, 11b cannot be nipped between the mating clamping surfaces 17a, 17b of clamp formations 16a, 16b respectively when tubular housing 15 is closed.

By moving the two halves 15a, 15b of tubular housing 15 into the closed position shown in FIGS. 6 and 7, the engagement formation 12 of bag A is nipped between the mating screw-threaded surfaces 17a, 17b of clamp formations 16a, 16b thereby to anchor the base of bag A and hence fix the extent of the mouth zone 6 of bag A which is available for folding over the open upper end 26 of the tubular housing 15. The two halves 15a, 15b of tubular housing 15 are releasably locked in the closed position by means of catch elements 19. (FIGS. 4 and 5). The mouth zone 6 of bag A may be folded over the open upper end 26 of tubular housing by suitable manipulation of tab formations 8 in readiness for container A to be filled with milk or the like.

After the filling of the container, a teat 21 with a transverse flange formation 21a thereon, may be located over the open upper ed of housing 15 to sandwich to mouth zone 6 of container A between flange formation 21a of teat 21 and the upper end 26 of housing 15. Internally threaded sealing or locking ring 22 may be placed in position over teat 21 and screwed onto the externally threaded neck 23 of housing 15 so as firmly and sealingly to clamp the mouth zone 6 of container A against the upper end of housing 15 and form a feeding bottle comprising housing 15, container A and teat 21.

As can be seen from FIG. 7, the shoulder formations 14a, 14b on container A may co-operate with the reduced neck zone 23 of housing 15 to assist in the location of container A in housing 15 and assist in fixing the extent of the mouth zone 6 of container A which is available for folding over the upper end of housing 15. With the arrangement according to the invention, the attachment formations 11a, 11b of container A are spaced apart sufficiently so that at least in the zones in which they are secured to bag A, attachment formations 11a, 11b are not engageable by the curved mating surfaces 17a, 17b of clamp formations 16a, 16b, whereby distortion of bag A is avoided or at least minimized when the curved mating surfaces 17a, 17b of clamp formations 16a, 16b engage and deform engagement formation 12 as shown in FIG. 6.

It is possible that in the region in which they are secured to engagement formation 12, attachment formations 11a, 11b may be distorted when engagement formation 12 is nipped between clamp formations 16a, 16b. However, the dimensions of attachment formations 11a, 11b and/or the spacing between the attachment formations 11a, 11b are such that substantially no distorting effect is transmitted to the base of bag A.

It will be appreciated that attachment formations 11a, 11b and engagement formation 12 constitute a tongue-like base formation C which depends from the body 5 of bag A, a part of such base formation C (namely the engagement formation 12) being adapted to be engaged by the clamping means of a tubular housing with very little or no distortion of the bag body 5 occurring. The tongue-like base formation C constitutes anchor means for locating the base of bag A in a fixed position in the tubular housing.

It will be appreciated that many variations in detail are possible without departing from the scope of the appended claims.

Figure 3:
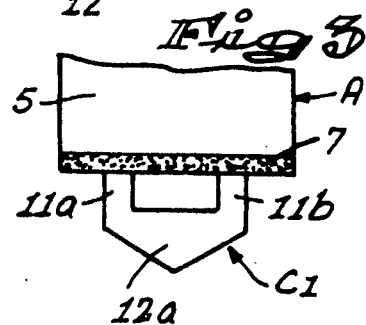
FIG. 3 is a fragmentary plan view of the lower region of a completed container, illustrating an alternative form of engagement formation on the container.

For example, the engagement formation on a bag A may have any suitable shape other than that shown in FIGS. 1, 2, 4 and 5. Thus, there may be provided a base formation with an engagement formation 12a having a shape as shown in FIG. 3.

In order to maintain the interior of a bag A clean and in a sterile condition until it is to be used, the mouth zone 6 of the bag may be releasably closed during manufacture by releasably sealing together the two superimposed layers of material 1a, 1b of the body portion 5 of the bag along a transverse zone 25 as shown in FIG. 1. The mouth of the bag may be opened by pulling the tab formations 8 apart when the bag is to be used.

Any suitable teat arrangement other than teat 21 and locking ring 22 may be used. Thus, a teat arrangement similar to that described in my SA complete patent specification No. 82/2208 with reference to FIG. 6 of the drawings accompanying that specification, may be used.

Also, a housing with clamping means similar to that described in my SA patent specification with reference to FIG. 7 of the drawings accompanying that specification, may be used.

I claim:

1. A flexible container adapted to be located in a tubular housing to constitute a baby feeding bottle, the container including an engagement formation which is spaced from the base of the container; and attachment means securing the engagement formation to a base zone of the container, the engagement formation being adapted to be engaged by clamping means located at low level in the tubular housing to anchor the base of the container and the attachment means being adapted at least to minimize distortion of the container when the engagement formation is engaged by the clamping means of the tubular housing, the attachment means comprising a pair of transversely spaced attachment elements extending longitudinally from the container and separated from each other by an open section and the engagement formation extending transversely between the attachment elements in a position spaced from the base of the container and being separated from the base of the container by said open section.

2. A container as claimed in claim 1, wherein the attachment elements are located relative to the base of the container such that at least in the zone in which they are secured to the container, the attachment elements are not engageable by the clamping means of the tubular housing.

3. A strip of containers comprising a series of flexible containers which are connected in separable end-to-end relationship, each container being adapted to be located in a tubular housing to constitute a baby feeding bottle and each container including an engagement formation which is spaced from the base of the container; and attachment securing the engagement formation to a base zone of the container, the engagement formation being adapted to be engaged by clamping means located at a low level in the tubular housing to anchor the base of the container and the attachment means being adapted at least to minimize distortion of the container when the engagement formation is engaged by the clamping means of the tubular housing, the attachment means comprising a pair of transversely spaced elements extending longitudinally from the container and separated from each other by an open section and the engagement formation extending transversely between the attachment elements in a position spaced from the base of the container and being separated from the base of the container by said open section.

4. A strip of containers as claimed in claim 3, wherein the attachment elements of each container are located relative to the base of the container such that at least in the zone in which they are secured to the container, the attachment elements are not engageable by the clamping means of the tubular housing.

5. A container as claimed in claim 1 or claim 2, wherein the attachment elements are integrally formed with the container and with the engagement formation.

6. A flexible container adapted to be located in a tubular housing to constitute a baby feeding bottle, the container including an engagement formation which is spaced from the base of the container; and attachment means securing the engagement formation to a base zone of the container, the engagement formation being adapted to be engaged between clamp formations comprising cooperating and longitudinally extending tongue and groove formations located at low level in the tubular housing to anchor the base of the container and the attachment means being adapted at least to minimize distortion of the container when the engagement formation is engaged by the clamp formations of the tubular housing, the attachment means comprising a pair of transversely spaced elements extending longitudinally from the container and separated from each other by an open section and the engagement formation extending transversely between the attachment elements in a position spaced from the base of the container and being separated from the base of the container by said open section, the attachment elements being located relative to the base of the container such that at least in the zone in which they are secured to the container the attachment elements are not engageable by the longitudinally extending tongue and groove clamp formations of the tubular housing.

7. A baby feeding bottle comprising:
a reusable housing of tubular configuration with an open upper end, the housing comprising two longitudinally divided sections which are linked together along a longitudinally extending hinge zone and are movable about the hinge zone between open and closed positions; and cooperating tongue and groove clamp formations located on the two housing sections at low level in the housing, the tongue and groove clamp formations extending longitudinally relative to the housing and being movable relative to each other in a direction transverse to the clamp formations about the longitudinally extending hinge zone between a separated inoperative position when the two housing sections are in open position and an operative position when the two housing sections are in their closed position; an open-ended disposable flexible container including an engagement formation which is spaced from the base of the container and a pair of transversely spaced attachment elements extending longitudinally from the container and securing the engagement formation to a base zone of the container, the attachment elements being separated from each other by an open section and the engagement formation extending transversely between the attachment elements and being separated from the base of the container by said open section, the container being adapted to be mounted in the housing with the engagement formation of the container clamped between the longitudinally extending tongue and groove formations on the housing to anchor the base of the container and with the mouth zone of the container folded over the open upper end of the housing when the two housing sections are in their closed position, the longitudinally extending attachment elements being adapted at least to minimize distortion of the container when the engagement formation is engaged by the tongue and groove formations; and a teat located on the upper end of the housing, and forming a seal over the mouth of the container.

8. A baby feeding bottle as claimed in claim 7, wherein:

the attachment elements of the container are arranged such that at least in the zone in which they are secured to the container, the attachment elements are not engageable by the clamp formations.

9. A baby feeding bottle as claimed in claim 7 or 8, wherein:

the housing includes a reduced neck zone towards its open upper end; and the container includes an open mouth zone which is less in width than the body of the container; and shoulder formations between the body of the container and the open mouth zone, the shoulder formations of the container being adapted to cooperate with the reduced neck zone of the housing to assist in the location of the container in the housing.

* * * * *